(12) United States Patent
Sadacharam et al.

(10) Patent No.: US 11,144,350 B2
(45) Date of Patent: Oct. 12, 2021

(54) AUTOMATIC MANAGEMENT OF SERVER OVERLOADS

(71) Applicant: International Business Machines Corporation, Armonk, NY (US)

(72) Inventors: Saravanan Sadacharam, Chennai (IN); Vijay Ekambaram, Chennai (IN); Vijay Kumar Ananthapur Bache, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 116 days.

(21) Appl. No.: 16/690,862

(22) Filed: Nov. 21, 2019

(65) Prior Publication Data

US 2021/0157636 A1      May 27, 2021

(51) Int. Cl.
| | | |
|---|---|---|
| *G06F 9/48* | (2006.01) | |
| *G06Q 10/06* | (2012.01) | |
| *H04L 12/24* | (2006.01) | |
| *G06F 9/50* | (2006.01) | |
| *H04L 12/26* | (2006.01) | |

(52) U.S. Cl.
CPC ............ *G06F 9/4881* (2013.01); *G06F 9/505* (2013.01); *G06F 9/5005* (2013.01); *G06F 9/5027* (2013.01); *G06F 9/5083* (2013.01); *G06Q 10/0631* (2013.01); *G06Q 10/06311* (2013.01); *G06Q 10/06316* (2013.01); *H04L 41/50* (2013.01); *H04L 41/5061* (2013.01); *H04L 43/10* (2013.01)

(58) Field of Classification Search
None
See application file for complete search history.

(56) References Cited

U.S. PATENT DOCUMENTS

| | | |
|---|---|---|
| 6,718,359 B2 | 4/2004 | Zisapel et al. |
| 6,871,347 B2 | 3/2005 | Hay |
| 2002/0174219 A1 | 11/2002 | Mei et al. |
| 2011/0154213 A1 | 6/2011 | Wheatley et al. |
| 2012/0233631 A1 | 9/2012 | Geshwind |

OTHER PUBLICATIONS

Lee et al., "Can Online Wait Be Managed? The Effect of Filler Interfaces and Presentation Modes on Perceived Waiting Time Online", Jun. 2012, MIS Quarterly, vol. 36 No. 2, pp. 365-394. (Year: 2012).*
Abdelzaher et al., "Web content adaptation to improve server overload behavior," Elsevier, 1999, 15 pages.
Mell et al., "The NIST Definition of Cloud Computing," Recommendations of the National Institute of Standards and Technology, U.S. Department of Commerce, Special Publication 800-145, Sep. 2011, 7 pages.

\* cited by examiner

*Primary Examiner* — Qing Yuan Wu
(74) *Attorney, Agent, or Firm* — Alex Harvey

(57) ABSTRACT

A system can determine if a server is overloaded and unable to process a request selected for transmission by a user. If the server is unable to process the request, the system can present buffer tasks for the user to complete while the system repeatedly pings the server, checking to see if the server is still unable to process the request. If the system detects that the server is not overloaded or no longer is overloaded, the system sends the request. The system can determine a priority of the request and adjust buffer tasks based on the priority.

20 Claims, 7 Drawing Sheets

AUTOMATIC MANAGEMENT OF SERVER OVERLOADS

BACKGROUND

The present disclosure relates to software, and more specifically, to detecting and managing overloaded servers in making requests.

Many programs and applications connect to and receive packets from a remote server as part of a core functionality. However, server resources are finite. If a server is overloaded with traffic, requests or tasks, the server may crash. If a "client" program requires connectivity with the server in order to function, the server crashing may also result in the client program crashing.

In response, a methodology known as "load balancing" is frequently implemented. The general goal of load balancing is to distribute traffic amongst several servers to efficiently utilize resources of various servers. There are several load balancing approaches utilized today, each with their own advantages and disadvantages.

SUMMARY

Some embodiments of the present disclosure can be illustrated as a method. The method may include obtaining a request, determining that a server is unable to process the request, and, responsive to the determination that the server is unable to process the request, selecting one or more buffer tasks, presenting the buffer tasks to a user, pinging the server, and determining, based on the pinging, whether the server is still unable to process the request.

Some embodiments of the present disclosure can also be illustrated as a computer program product comprising a computer readable storage medium having program instructions embodied therewith, the program instructions executable by a computer to cause the computer to perform the method discussed above.

Some embodiments of the present disclosure can be illustrated as a system. The system may comprise memory and a central processing unit (CPU). The CPU may include a plurality of CPU cores configured to obtain a request, determine that a server is unable to process the request, and, responsive to the determination that the server is unable to process the request, select one or more buffer tasks, present the buffer tasks to a user, ping the server, and determine, based on the pinging, whether the server is still unable to process the request.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. Features and advantages of various embodiments of the claimed subject matter will become apparent as the following Detailed Description proceeds, and upon reference to the drawings, in which like numerals indicate like parts, and in which:

Figure 1:
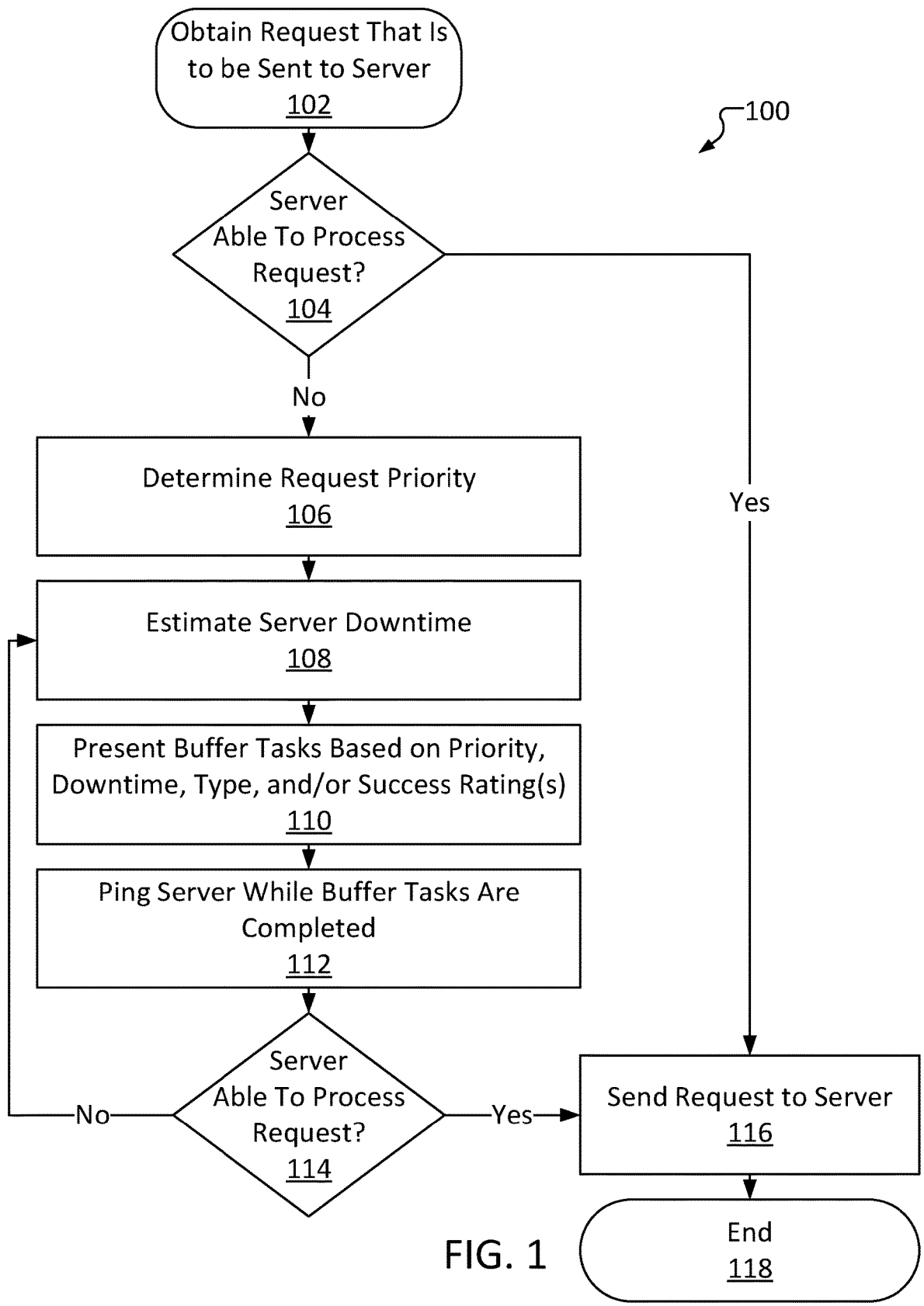
FIG. 1 illustrates a high-level block diagram of an automated server overload management method, according to several embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to a system and method to manage server overloads. More particular aspects of the present disclosure relate to a system to detect a server overload, determine a priority level of a request, and select, based on the priority level, one or more buffer tasks to be completed.

Server overloads often result in user frustration. Further, user frustration may in turn result in financial losses. For example, if a user is attempting to make an online purchase and a seller's server overloads, resulting in a failed transaction, the user may simply abandon the attempt or make the purchase elsewhere, resulting in a lost opportunity for the seller. Even server slowdowns (i.e., not full crashes) can result in the same or similar issues.

Throughout this disclosure, reference is made to one or more "requests." As used herein, "request" refers to a data package, packet, or group of packets containing computer-readable instructions. For example, in order to complete an online transaction, a user may send a request to a remote server via a user's device. The request may include, for example, a purchase order. The remote server may receive and process the request, and respond to the user by transmitting a confirmation to the user's device.

There are several possible scenarios where a server may be unable to process a request. For example, a server may have completely crashed and is thus unable to process any data at all until it has recovered. In other scenarios, a server may be experiencing a significant slowdown due to heavy traffic but may still be operational. In many typical systems, load balancing may result in some users being able to submit their requests while other users are prohibited. Often, the "prohibited" users are simply presented with an error message, which frequently results in the users becoming frustrated and abandoning the request.

In some embodiments of the present disclosure, user requests may be assigned a "priority." Similarly, users themselves may be associated with the priority of their request (for example, a user making a high-priority request may be considered a "high-priority user"). This priority may be used to determine what kind of action to take while a server is unable to process requests. For example, if a server is operational but experiencing a slowdown such that it cannot process a request immediately (but will likely be able to shortly, for example within the next three seconds), both users who are attempting to submit higher-priority requests and users who are attempting to submit lower-priority requests may be presented with one or more buffer tasks. However, in such a "slowdown" scenario, a lower-priority user may be presented with additional buffer tasks (for example, a low-priority user may be presented with three buffer tasks while a high-priority user may be presented with one buffer task). This may allow higher priority users to complete their buffer task(s) first, allowing the higher priority requests to be sent and processed earlier.

As an illustrative example, the server may recover such that it is able to process requests again after three seconds, where a buffer task may take approximately five seconds to complete. Thus, if high-priority users are presented with one buffer task and lower-priority users are presented with three buffer tasks, then the high-priority requests may be submitted after five seconds with an approximately ten-second window before the lower-priority requests are submitted. This may prevent the lower-priority requests from competing for server resources with the higher-priority requests, which may be limited if the server has recently recovered from an overload scenario. Further, lower-priority users may be occupied with buffer tasks, whereas without the buffer tasks the lower-priority users may become frustrated with an error message and possibly leave or otherwise abandon their requests.

Priority may also be used determine what specific buffer tasks to present. For example, buffer tasks may be selected based on their approximate completion time (particularly with reference to an estimated time before the server is able to process a request); some buffer tasks may be expected to take longer to complete than others. For example, a CAPTCHA may take approximately five seconds to complete, while a one-time password (OTP) may take approximately eight seconds to complete. Thus, high-priority users may be presented with buffer tasks predicted to take approximately as long to complete as an estimated downtime, or slightly longer, while lower-priority users may be presented with buffer tasks predicted to take more time. Further, if a downtime is shorter than all possible buffer tasks (for example, two seconds), higher-priority users may not be presented with a buffer task at all; instead, they may simply be presented with a "loading" icon or similar. However, lower-priority users may still be presented with one or more buffer tasks in order to allow for higher-priority requests to be submitted before lower-priority requests. In some embodiments, the "loading" icon may be utilized as a "filler" if no combination of buffer tasks is within a threshold of the downtime; for example, if the downtime is six seconds and a first buffer task takes four seconds while a second buffer task takes nine seconds, a high-priority user may be presented with the first buffer task and two seconds of the "loading" icon. On the other hand, a low-priority user may be presented with the second buffer task, or even both.

Thus, higher-priority requests are generally processed first, but users who are "delayed" are still less likely to abandon the request, advantageously mitigating one of the primary disadvantages of load-balancing. In other words, systems and methods consistent with the present disclosure may significantly improve retention of high priority users without significantly sacrificing retention of low priority users. Instead, retention of low priority users may be increased as well. However, in some embodiments, the loss of some low priority users may be accepted in order to further improve retention of higher priority users.

In some embodiments, if a server has crashed entirely, a higher priority user may be presented with one or more buffer tasks while a lower-priority user may be presented with an error message, likely prompting the lower-priority user to abandon the request. In some embodiments, if the server has crashed entirely, the lower-priority user may be presented with buffer tasks that are likely to result in the lower-priority user abandoning the request. In some embodiments, if the server has crashed entirely, the lower-priority user may be presented with buffer tasks that are likely to keep the lower-priority user occupied both while the server recovers and while the newly recovered server handles any higher-priority requests.

Regardless of server scenario, if the server is unable to process a high-priority request, higher-priority users may be presented with buffer tasks that the higher-priority users are likely to complete (as opposed to being presented with tasks that they may refuse to complete, opting instead to abandon the request). Thus, depending upon embodiment and server scenario, priority may determine what kind of buffer tasks to present to a user, or whether to present buffer tasks to a user at all. However, in some embodiments, priority may not be utilized at all; instead, all users may be presented with buffer tasks.

FIG. 1 illustrates a high-level block diagram of an automated server overload management method 100 according to several embodiments of the present disclosure. Method 100 may be performed by, for example, a user device such as a mobile device, computer, tablet, and the like, or an application executing on such a device. Method 100 includes obtaining a request that is intended to be sent to a server 102. This may include, for example, packaging data into one or more packets as a result of a user input (such as selecting a "purchase" option, selecting a "next page" option, etc.), where the packaged data is to be transmitted to a remote server. Requests may be associated with, for example, financial transactions, social media, business accounts, general web browsing, etc. Method 100 further includes determining whether the server is able to process the request 104. This may include, for example, attempting to transmit the request, pinging a server, and the like. In some embodiments, a server experiencing a significant slowdown may be treated as "unable to process the request" for purposes of operation 104. In some embodiments, determining whether the external server is able to process the request 104 may further include receiving or determining an estimated delay. For example, if a server is overloaded, a system communicating with the server may be capable of determining an estimated time before the server is capable of handling the request. If the server is responding and capable of receiving and processing the request (104 "Yes"), method 100 includes sending the request to the server 116 and ending 118.

If the server is unable to process the request (104 "No") (for example, if, the server is overloaded), method 100 further includes determining or identifying a priority of the request 106. This may include, for example, determining whether the request indicates that the user is attempting (or likely to attempt) to make a significant purchase, whether the user is simply browsing, whether the user is a new or a regular user of an application executing on a system configured to perform method 100 (such as, for example, system 200 of FIG. 2), etc.

Method 100 optionally further includes estimating a "downtime" of the server (or a "delay time") 108. Estimating the delay time may include generating an estimate of a delay time. This may be based on context information such as, for example, information received from a different server, a time of day and/or year (which may suggest that the server is overloaded due to heavy traffic vs. down for other purposes), and the like. The estimated delay time may represent an amount of time before the server is expected to be capable of handling the request. For example, an estimated delay time may be 20 seconds, 5 seconds or less, one minute or greater, etc.

Method 100 further includes selecting and presenting one or more "buffer tasks" based on a priority of the request and/or the estimated downtime (if any) 110. Operation 110 also includes selecting and presenting buffer tasks based on a category, a type, and/or a success rating of the task(s), as will be described in further detail below. Buffer tasks may include tasks for a user of the system to complete that may not be strictly necessary for completion, fulfillment, or transmittal of the request, but do not require connectivity with the same server that was determined, in operation 104, to be unable to process a request. Buffer tasks may include, for example, prompting a user to complete a CAPTCHA, enter a one-time password (OTP), verify the user's identity via answering one or more security questions, prompt for biometric verification (e.g., facial recognition via a camera, voice recognition via a microphone, fingerprint verification via a fingerprint scanner, etc.), and the like.

Buffer tasks may be organized into categories (distinct from "types") such as identity verification (passwords, biometrics such as fingerprint/facial scans), retention-related tasks (e.g., setting up an account, answering a questionnaire), distributed computing tasks (e.g., CAPTCHAs, image recognition, etc.), or challenges (such as a puzzle or mini-game). In some embodiments, buffer tasks may be selected at random from a buffer task database. In some embodiments, users may be prompted to choose a buffer task or buffer task category. In some embodiments, buffer tasks may be selected based on context information, including, for example, historical information regarding the user's completion (or refusal to complete) certain buffer tasks. For example, if a certain user has never completed a CAPTCHA task but always completes one-time password (OTP) tasks, operation 108 may prefer to select an OTP task where possible. However, if a user has repeatedly verified his or her identity, further identity verifications may be more likely to cause frustration, and thus subsequent buffer task selection may be biased against verification-style buffer tasks.

The buffer tasks may be selected and presented based, at least in part, on user and/or request priority. For example, in some embodiments, both high and low priority users are presented with buffer tasks, but as server resources become available, requests associated with/made by higher priority users may be submitted to the server while lower priority users are presented with additional buffer tasks. In these instances, neither high nor low priority users would be immediately faced with frustrating failure messages, but higher-priority requests (i.e., requests associated with/made by higher-priority users) would still be submitted to the server first. In some embodiments, lower priority users may be presented with buffer tasks that are more likely to result in the user abandoning the attempt, but without the associated frustration of an error message.

In some embodiments, the number or type of buffer tasks selected and/or presented may be further based upon the estimated delay before the server is expected to be able to handle the request. For example, if an expected delay is twenty seconds, a user may be presented with a CAPTCHA and a one-time password, assuming those two tasks are estimated to take approximately twenty seconds. Estimated time for buffer task completion may be updated and refined over time based upon actual completion times, either from the same user or from aggregated information collected regarding multiple users.

In some embodiments, operation 110 may also include selecting no buffer tasks; in other words, operation 110 may include determining, based on the priority, not to present any buffer tasks. For example, a high priority user may not be presented with any buffer tasks if an estimated downtime is less than two seconds, as simply waiting out the delay may be less frustrating than a buffer task. Further, in some embodiments, a low priority user may not be presented with any buffer tasks in order to motivate the low priority user to abandon the request. In cases where the estimated delay time is extreme (for example, over ninety seconds), intentionally motivating a low priority user to leave may be a less detrimental option than presenting a long chain of buffer tasks. This is because the user might be expected to abandon the request either way, and a user may be more frustrated when abandoning a request after completing a series of buffer tasks than when abandoning a request after receiving an error message.

While a user is completing buffer tasks, method 100 further includes pinging a server 112. This way, the user has something to do while a system waits for server response. Therefore, the user is less likely to become frustrated and/or abandon the attempt, advantageously improving user experience and retention. The pinged server may be the same server that was determined to be unable to process the request in operation 104 (the "processing server"), or may be a different server capable of reporting on a status of the processing server.

Method 100 further includes determining, based on the pinging, whether the server is able to process the request yet 114. If the server is still unable to process the request (114 "No") (for example, if the server is not responding or is still experiencing a significant slowdown), method 100 may continue to estimate downtime 108, present buffer tasks 110 and ping the server 112. In some embodiments, if the server is still unable to process the request (114 "No"), method 100 may simply continue to present buffer tasks 110 and ping the server 112 (i.e., may not estimate downtime 108).

If the server is capable of processing the request (114 "Yes") (for example, if the server has recovered), method 100 proceeds to send the request to the server 116 and end 118. In some embodiments, if a user is still in the process of completing a buffer task when the server is detected to become responsive, the user may be allowed to complete the task. In some embodiments, any current buffer task may be interrupted and ended immediately. In some embodiments, a user may be presented with an option to skip the buffer task—for example, a system may display a "Skip" button that a user may press rather than complete the buffer task.

In some embodiments, lower priority requests may not be assigned buffer tasks, or may be assigned fewer buffer tasks. In some embodiments, if all assigned/selected buffer tasks have been completed, a simple loading icon may be displayed. In some embodiments, if all assigned/selected buffer tasks have been completed, one or more additional buffer tasks may be selected and/or assigned. In some embodiments, "repeat" buffer tasks may be avoided (a system may instead display a loading icon or similar once all unique buffer tasks have been completed), but in some embodiments, a user may be presented with the same buffer task more than once. These buffer tasks may increase a user's willingness to wait for the server to come back online. Further, if any users do leave, those associated with lower-priority requests may be more likely to leave first. For example, if the lower priority users were not presented as many buffer tasks and completed all of them, they may be presented with a waiting or error message, which may result in them leaving while higher priority users are still completing buffer tasks. If lower priority users leave first, this may advantageously free up resources for the higher-priority requests.

Figure 2:
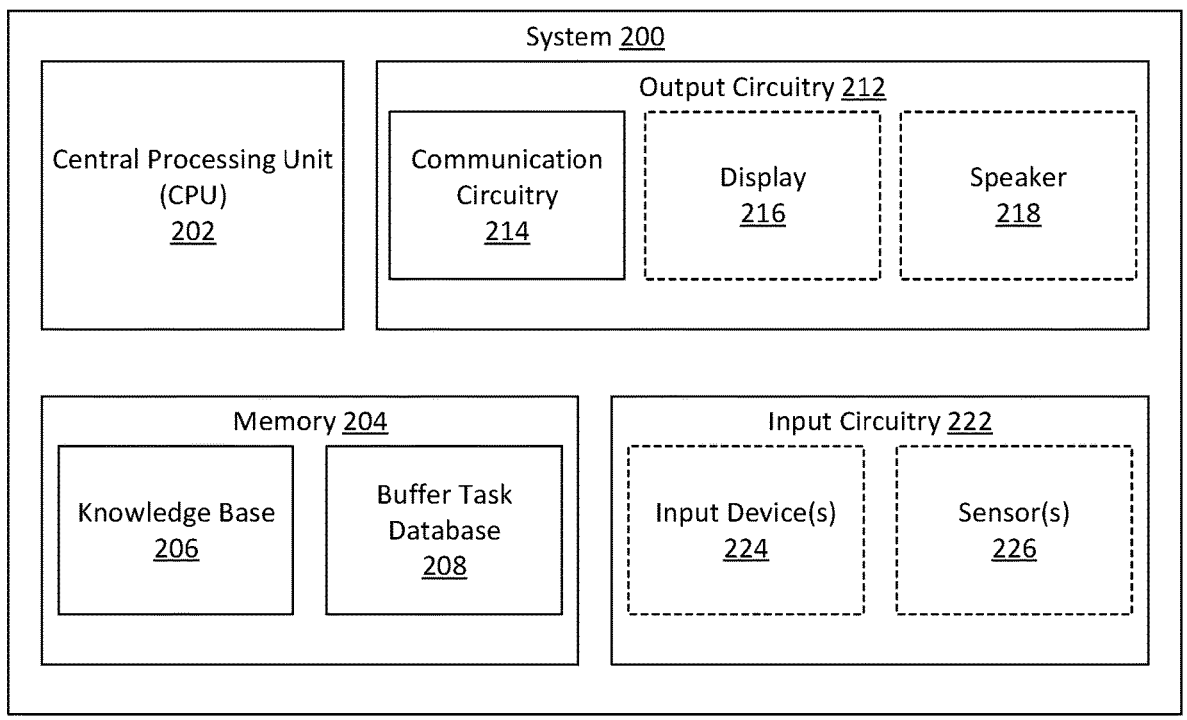
FIG. 2 illustrates a high-level block diagram of an automated server overload management system, according to several embodiments of the present disclosure.

FIG. 2 illustrates a high-level block diagram of an automated server overload management system 200 according to several embodiments of the present disclosure. System 200 includes a central processing unit (CPU) 202, memory circuitry 204 including a knowledge base 206 and a buffer task database 208, output circuitry 212 and input circuitry 222. System 200 may be configured to perform server overload management operations such as, for example, operations 102-118 of method 100 (FIG. 1), operations 302-318 of method 300 (FIG. 3), operations 402-418 of method 400 (FIG. 4), etc.

Memory circuitry 204 is configured to store a knowledge base 206, which may include, for example, one or more arrays indicating machine learning parameters, correlations (for example, correlations between user identities, request types, purchase history, etc.), and the like. In some embodiments, knowledge base 206 may be stored in nonvolatile storage such as one or more hard disk drives, solid state drives, etc. Buffer task database 208 may include information related to buffer tasks, such as CAPTCHA images, OTP systems, etc. Buffer task database 208 may further include indications as to which tasks are more effective for various requests, users, request priorities, and the like.

Input circuitry 222 includes one or more input devices 224 and/or one or more sensors 226. Input devices 224 may include, for example, one or more keypads, touch screens, computer mice, keyboards, and the like. Sensors 226 may include, for example, one or more microphones, cameras, accelerometers, gyroscopes, thermometers, and the like.

Output circuitry 212 includes communication circuitry 214 configured to communicate requests to an external server (not pictured in FIG. 2). Communication circuitry 224 is also capable of transmitting "pings" to enable system 200 to determine whether the external server is responding. Communication circuitry 214 is configured to communicate requests and pings to external systems and/or users via, for example, the internet, Wi-Fi, Bluetooth, near-field communications (NFC), etc.

Output circuitry 212 may also include one or more displays 216 and/or speakers 218 to enable system 200 to present buffer tasks to a user of system 200. For example, if system 200 selects a CAPTCHA task for a user to complete, the CAPTCHA may be displayed via a display 216. Further, if no buffer task is selected, a loading icon (or error message) may be displayed on a display 216. System 200 may not necessarily include display 216; instead, a buffer task may ask a user to verify identity by asking a question via one or more speakers 218. In some embodiments, output circuitry 212 may include both display(s) 216 and speaker(s) 218. In some embodiments, output circuitry 212 may include additional components such as, for example, one or more motors to produce a vibrating sensation, etc.

Figure 3:
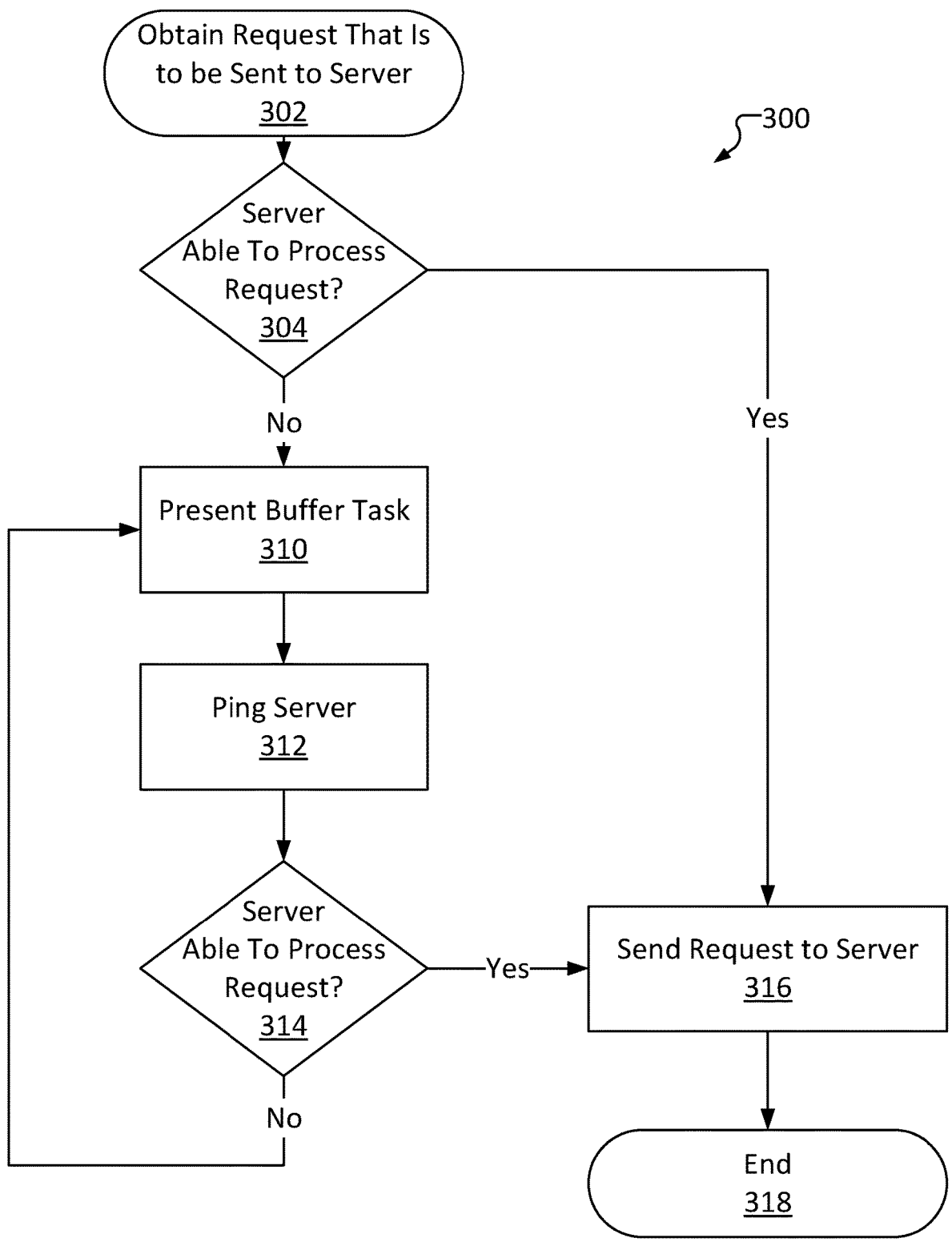
FIG. 3 illustrates a high-level block diagram of a priority-independent automated server overload management method, according to several embodiments of the present disclosure.

FIG. 3 illustrates a high-level block diagram of a priority-independent automated server overload management method 300 according to several embodiments of the present disclosure. Method 300 may be performed by, for example, system 200 or an application executing thereon. Method 300 includes obtaining a request 302, where the request is intended to be sent to a server. This may include, for example, packaging data into one or more packets to be sent to the server in response to a user input. Method 300 further includes determining whether the server is able to process the request 304. This may include, for example, attempting to send the request to the server, pinging the server, etc.

If the server is able to process the request (304 "Yes"), method 300 includes sending the request to the server 316 and ending 318. If the server is unable to process the request (304 "No"), method 300 includes presenting a buffer task 310. This may include, for example, selecting a buffer task from a database of buffer tasks (such as buffer task database 208 of FIG. 2). In some embodiments, the buffer task may be selected at random. In some embodiments, the buffer task may be selected based on a predetermined order. In some embodiments, there may only be one buffer task to select. Once the buffer task is selected (if necessary), operation 310 further includes presenting the task such as, for example, causing an image depicting the task to be displayed, causing text describing the task to be displayed, causing a speaker to emit sounds regarding the buffer task, etc. Operation 310 may include presenting the buffer task to a user, such as the user responsible for the input resulting in the request at operation 302. Presenting the buffer task may further include enabling a user to complete the buffer task via, for example, one or more user inputs. For example, if the buffer task is a CAPTCHA, a text field for a user to enter a response may be provided.

Method 300 further includes pinging a server 312. The pinged server may be the same server that was determined to be unable to process the request in operation 304 (the "processing server"), or may be a different server capable of reporting on a status of the processing server. Operation 312 may be performed after or as the buffer task is being presented and/or completed by the user. Thus, while a system is pinging the server 312, the user is preoccupied and therefore less likely to abandon the request out of frustration.

Method 300 further includes determining whether the processing server is able to process the request yet 314. This may be determined as a result of the pinging, although in some embodiments, operation 314 may include receiving a notification (independent of any pings) that the processing server is able to process the request. If the server is able to process the request (314 "Yes"), method 300 further includes sending the request to the server 316 and ending 318. If the server is still unable to process the request (314 "No"), method 300 includes continuing to present buffer tasks 310. This may include, for example, selecting another buffer task (which may or may not be of the same category or type as the initial buffer task), continuing to present the same buffer task (if the user has not completed it yet), presenting the same buffer task a second time, etc.

Notably, method 300 may not depend on contextual information such as request priority, user priority, estimated server downtime, success rating, etc. Instead, if a server is unable to process a request, the user is automatically presented with at least one buffer task (i.e., operation 310).

Figure 4:
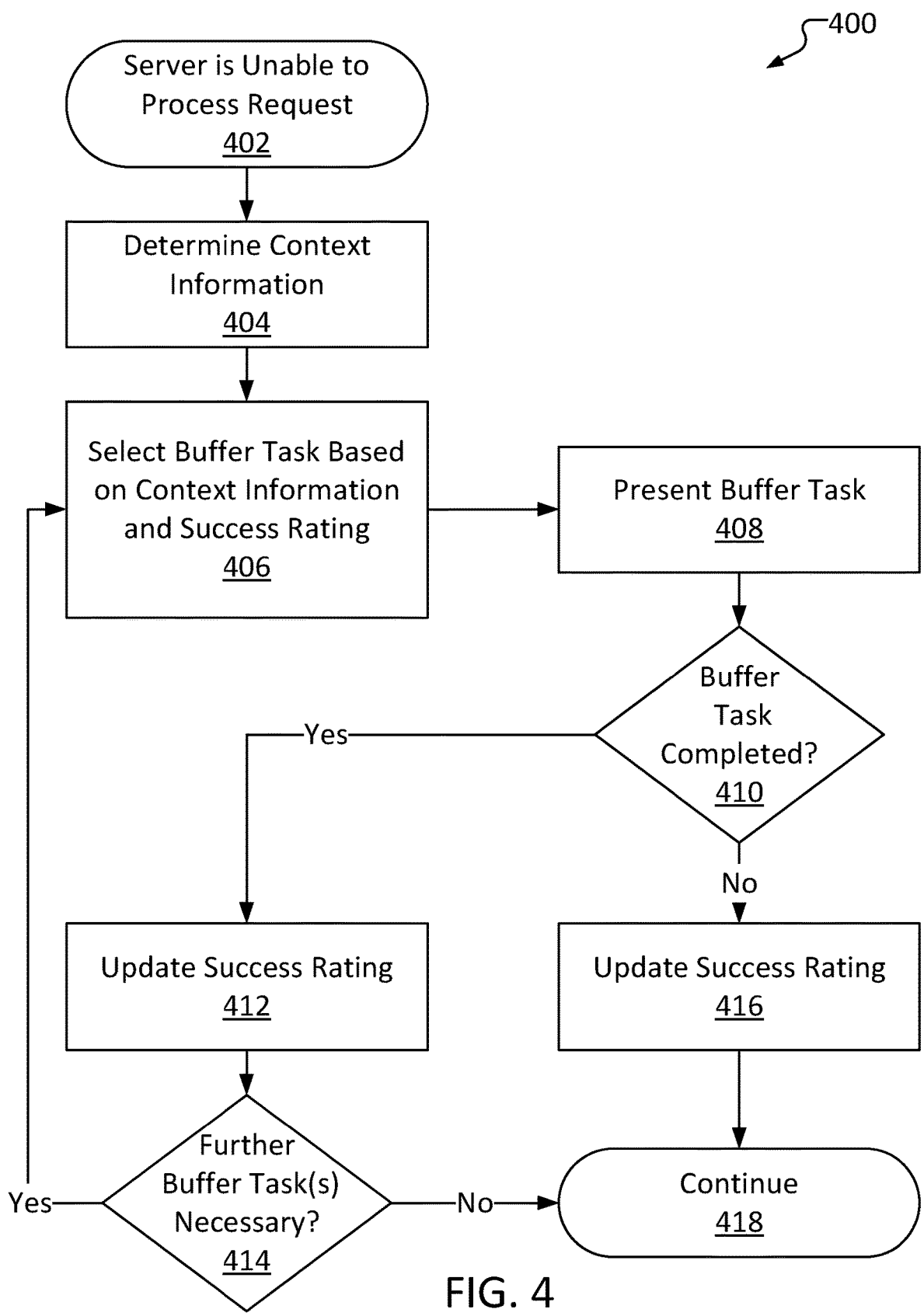
FIG. 4 illustrates a high-level block diagram of an automated server overload management method including success rating tracking, according to several embodiments of the present disclosure.

FIG. 4 illustrates a high-level block diagram of an automated server overload management method 400 that includes success rating tracking according to several embodiments of the present disclosure. Method 400 may be performed as a part of, for example, methods 100 or 300. Method 400 includes determining that a server is unable to process a request 402. This may be analogous to, for example, 104 "No" of method 100 (FIG. 1), 304 "No" of method 300 (FIG. 3), etc. Method 400 further includes determining context information 404. Context information may include, for example, a priority of the request, a priority of a user making the request, an estimated downtime of the server, a server failure scenario (such as "crashed entirely" "slowdown due to heavy traffic but still operational," etc.) and the like. Thus, operation 404 may include operations similar to those described with reference to operation 106 of method 100 and operation 108 of method 100.

Method 400 further includes selecting one or more buffer tasks based on the context information and success rating 406. This may include, for example, selecting buffer tasks from a buffer task database (such as buffer task database 208 of FIG. 2) to be presented to the user based on one or more of, for example, priority of the request, priority of the user, estimated delay or down time of the server, server failure scenario, and success rating of the potential buffer task(s). The success rating may be stored as a tag appended to the buffer task in the buffer task database, or may be determined based on context information and historical data.

In general, buffer tasks that are expected to be completed by the user are considered to have a higher success rating, and buffer tasks with higher success ratings are more likely to be selected. This may advantageously improve user retention. However, in certain situations, a buffer task with a low success rating may be selected. This may be the best option if no buffer tasks with better success ratings are available or if all available "better" buffer tasks have already been presented to the user with regard to the same request. Further, in some embodiments, operation 406 may include selecting a buffer task with a low success rating even if buffer tasks with higher success ratings are available. This may be beneficial if, for example, the low success rating is due to it associated buffer task being relatively "untested" (in that a system performing method 400 has little information about whether the buffer task is typically successful, possibly because the task is new or because the context information indicates a unique or rare situation). If the request is of a lower priority, this may be a lower-risk opportunity to "test" buffer tasks and further refine their success ratings.

In addition, in some embodiments operation 406 may include selecting a buffer task with a well-established low success rating even if buffer tasks with higher success ratings are available. This may be beneficial if, for example, a system would benefit from driving away a specific type of user or request, such as, for example, a request made by a malicious actor; for example, a request may be detected to be affiliated with a distributed denial of service (DDoS) attack (the act of submitting an extreme amount of requests with the intent to overload a server). In typical situations where malicious activity is detected, the associated request is often simply denied, but a "bad" buffer task may be preferable to outright denying the request; for example, it may assist in preventing malicious actors from realizing they have been identified as such.

Method 400 further includes presenting the buffer task(s) 408. This may include, for example, causing text and/or an image to be displayed on a display, causing sounds to be emitted by a speaker, causing a motor to produce a vibration to notify a user of the buffer task, etc.

Method 400 further includes determining whether the buffer task(s) were completed 410. This may include, for example, determining whether a response was received; if a CAPTCHA response is submitted, for example, this may indicate that the user completed a CAPTCHA (successfully or not). On the other hand, several actions may indicate that the buffer task was not completed and/or that the request was abandoned. For example, the user may expressly abandon the request (such as by selecting a "close" or "stop" option). Further, if the user locks a device on which the buffer task was presented (such as a mobile phone or tablet) without submitting a response, this may indicate that the user does not intend to complete the task. Other possibilities include detecting that the user has gone idle (for example, detecting that no user input has been received for over 15 seconds), detecting that an application associated with the request and/or processing server (such as a retailer-specific application where the request was a purchase request) is no longer the active application (indicating that the user may have switched to an alternative option or simply given up entirely), and the like. However, this detection may depend upon the buffer task selected; for example, a one-time password (OTP) buffer task may include sending the password to the user via text message. Thus, in order to complete such a buffer task, the user is likely to switch to a messaging application (thus making the application associated with the request temporarily inactive), in which case detecting that the request application has gone inactive would not necessarily suggest that the user has abandoned the request. If multiple buffer tasks are presented sequentially and the user completes some but not all of them, operation 410 may result in a "yes" for the completed tasks but "no" for at least the first presented buffer task that the user did not complete. In some embodiments, detecting a refusal or other failure to complete a buffer task may result in presenting an additional buffer task 408.

If the user has completed the buffer task (410 "Yes"), method 400 further includes updating the success rating of the buffer task 412. This generally includes increasing the success rating. The exact nature of the increase may depend on how the success rating is implemented. For example, if the success rating tracks a ratio of "times completed" to "times presented," operation 412 may include incrementing both values by one. If the success rating tracks a net difference between "times completed" and "times not completed," operation 412 may include increasing the "times completed" rating by one. Other implementations are also possible and considered herein, as will be understood by those of skill in the art.

After updating the success rating 412 of a completed buffer task, method 400 further includes determining if further buffer tasks are necessary 414. This determination may be based on, for example, determining whether the server is able to process the request yet, reevaluating context information (such as a remaining delay time), comparing a length of time the user spent before the buffer task was completed to an expected time, etc. If any additional buffer tasks are necessary (414 "Yes"), method 400 returns to selecting another buffer task 406 and proceeds as before.

If no additional buffer tasks are necessary (414 "No") method 400 "continues" 418. For example, if method 400 is being performed as a part of method 100, "continuing" 418 after presented buffer tasks were completed may include sending the request to the server and ending (i.e., 116 and 118 of FIG. 1).

If the user has not completed the task (410 "No"), method 400 further includes updating the success rating of the buffer task 416. This may include, for example, subtracting one from a "net difference" value, adding one to a denominator of a "completion ratio," depending upon implementation of the success rating, as described above in relation to operation 412. Method 400 then proceeds to "continuing" 418. If the user has not completed a presented buffer task, continuing 418 may simply include abandoning the request. However, in some embodiments, the user may not complete the request but an application associated with the request may remain active. This may suggest that the user has simply chosen to ignore the buffer task wait for the server to be available. In this situation, continuing 418 may include pinging a server and determining whether the processing server is able to process the request, similar to operations 112 and 114 of method 100 (FIG. 1). An example system consistent with the present disclosure may be configured to obtain a request, where the request is a data package to be communicated to a server, and receive packets from the server. The system may determine whether the server is able to process the request (for example, if a request to the server has failed but unrelated network connectivity for the system is otherwise operational). If the server is unable to process the request (for example, if the server is overloaded), the system may determine a priority of the request. Based on the priority of the request, the system may present one or more buffer tasks (where the buffer tasks are to be completed by, for example, a user of the system).

In some embodiments, an example system consistent with the present disclosure may be configured to determine, monitor, and/or track a "success" rating for various buffer tasks. For example, if multiple users are presented with the same particular buffer task (such as a CAPTCHA), and most of those users abandon their request (for example, closing a related application, making a new request, attempting to refresh a webpage, etc.) rather than complete the buffer task, then the CAPTCHA could be determined to have a relatively poor success rating. In some embodiments, buffer tasks with lower success ratings may be less likely to be selected for use from buffer task database 208. Similarly, buffer tasks that are more frequently completed by users may be associated with a relatively high success rating. A success rating for a buffer task may be represented, for example, as a value ranging from 0 to 1 stored in buffer task database as a tag to a particular entry (i.e., a particular buffer task). Success ratings may be updated as buffer tasks are completed (or ignored), such as, for example, during operation 112 of FIG. 1 or method 400 of FIG. 4.

In some embodiments, buffer tasks may be sorted by "type," and success ratings may be specific to the type. For example, some buffer tasks may be more effective as "first" buffer tasks, as "sole" buffer tasks, or as "chain" buffer tasks. As used herein, a "first" buffer task may refer to a buffer task which may have a high success rating (relative to other possible selections) if it is presented to a user before any other buffer tasks are presented and/or completed, but may have a low success rating if presented after other buffer tasks. A "sole" buffer task may refer to a buffer task selected to be presented to a user when only a single buffer task is expected to be necessary (such as when the expected delay before server capacity is restored is less than an expected completion time for the selected buffer task). A "chain" buffer task may refer to a type of buffer task which has a relatively lower drop in success rating when presented multiple times to a user. For example, users may be more willing to complete multiple CAPTCHAs, while presenting a user with multiple biometric verifications may be more likely to result in user frustration/request abandonment. Thus, a CAPTCHA buffer task may have a relatively higher success rating as a "chain" type than a biometric verification buffer task. However, if only a single buffer task is needed, users may be more willing to complete a single biometric verification than a CAPTCHA, so the biometric buffer task may have a relatively higher rating as a "sole" type than the CAPTCHA. These success ratings may be determined and revised over time based on, for example, one or more machine learning methodologies (e.g., concurrent neural networks (CNNs)). In some embodiments, buffer tasks are restricted to a single type. In some embodiments, buffer tasks can be multiple types. In some embodiments, information regarding request and/or user priority, buffer task selection and completion, success ratings, etc. may be compiled and/or tracked via one or more external systems, such as one or more cloud computing systems.

In some embodiments, actual accuracy and/or correctness of a user's response to a buffer task may not necessarily be enforced. For example, if a system consistent with the present disclosure presents a user with a CAPTCHA buffer task and the user inputs an incorrect response to the CAPTCHA, the system may proceed as if the user had entered a correct response (i.e., considering the buffer task "completed," proceeding to either submit the request or present another buffer task, etc.). In some embodiments, the system may disregard the user's input entirely (i.e., may not even check for accuracy/correctness). As verification of some buffer tasks (such as, for example, security questions) may require network connectivity and at least some bandwidth, it may be advantageous to forego verification in favor of more quickly sending the request to the external server. However, where bandwidth is not a concern, verifying accuracy of buffer tasks may advantageously provide boosted security in addition to preventing user frustration.

In some embodiments, a system may present a user with an option to complete additional buffer tasks. This option may be incentivized via one or more rewards, such as, for example, a discount, coupon, etc. In some embodiments, this reward may be based on the priority level of the request/user, or on context information determined based on the user's behavior prior to or after the request (contents of a shopping cart, browsing history, purchase history, number and/or type of buffer tasks completed so far, etc.). This may advantageously allow users to voluntarily reduce load on a server without significantly increased risk of losing the user's request or transaction.

Notably, the systems and methods described herein may be server-agnostic. In other words, systems and methods according to embodiments of the present disclosure do not require modification or adjustment of the external servers being interacted with. However, in some embodiments, aspects of a system (such as, for example, an application executing on system 200) may be administered by an entity that also runs or manages the external server. For example, system 200 may comprise a mobile device executing an application that is distributed, developed, and/or administered by a retailer, while the external server may be the same retailer's online transaction server. However, in some embodiments, system 200 may not be affiliated with the external server.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
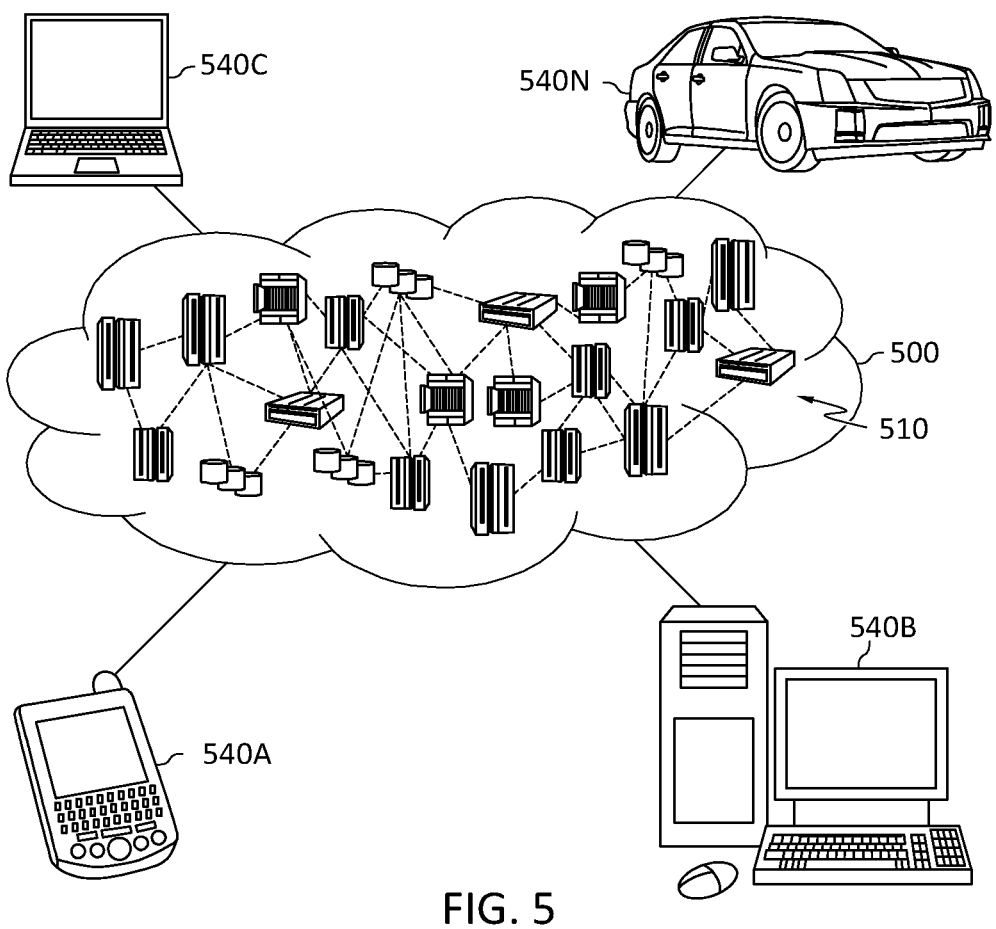
FIG. 5 depicts a cloud computing environment according to an embodiment of the present disclosure.

Referring now to FIG. 5, illustrative cloud computing environment 500 is depicted. As shown, cloud computing environment 500 comprises one or more cloud computing nodes 510 with which local computing devices used by cloud consumers, such as, for example, personal digital assistant (PDA) or cellular telephone 540A, desktop computer 540B, laptop computer 540C, and/or automobile computer system 540N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 540A-N shown in FIG. 5 are intended to be illustrative only and that computing nodes 510 and cloud computing environment 500 can communicate with any type of computerized device over any type of network and/or network addressable connection (e.g., using a web browser).

Figure 6:
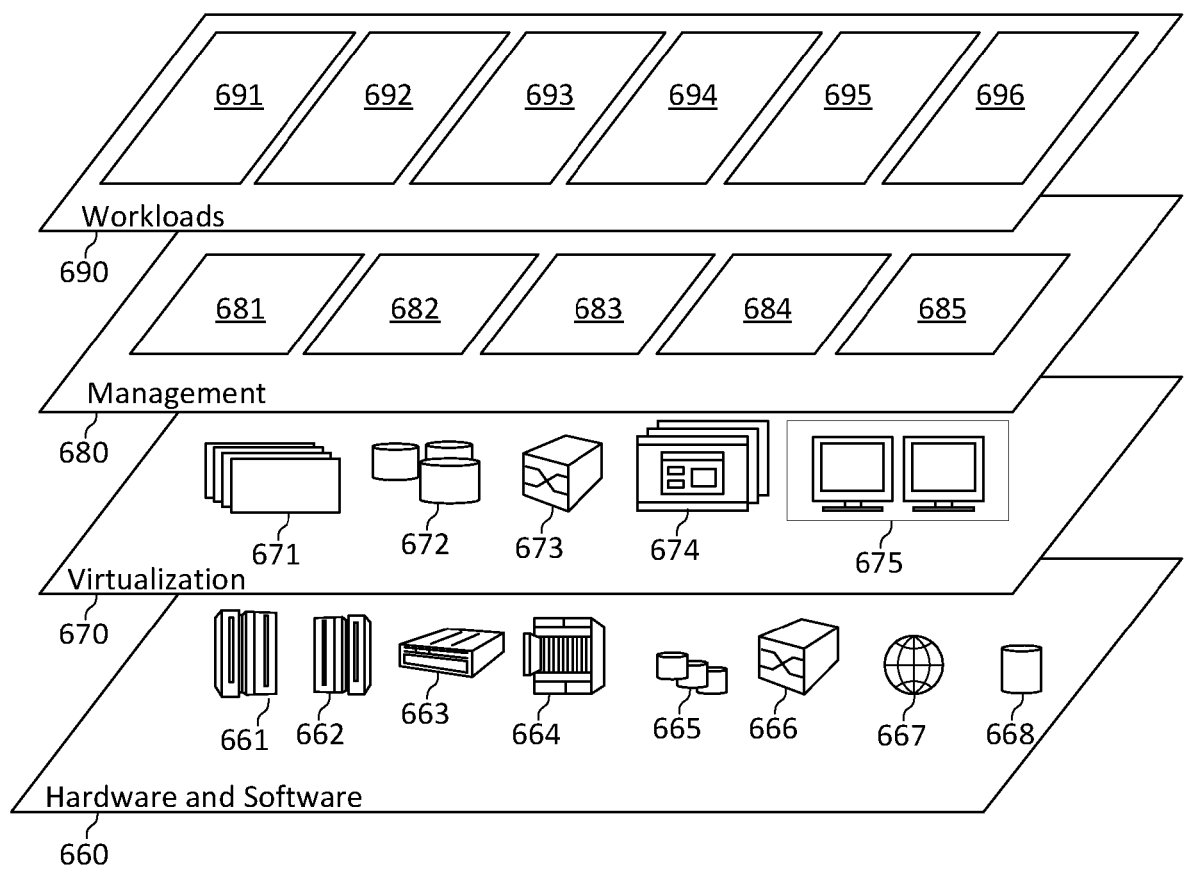
FIG. 6 depicts abstraction model layers according to an embodiment of the present disclosure.

Referring now to FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and managing server overloads 696.

Figure 7:
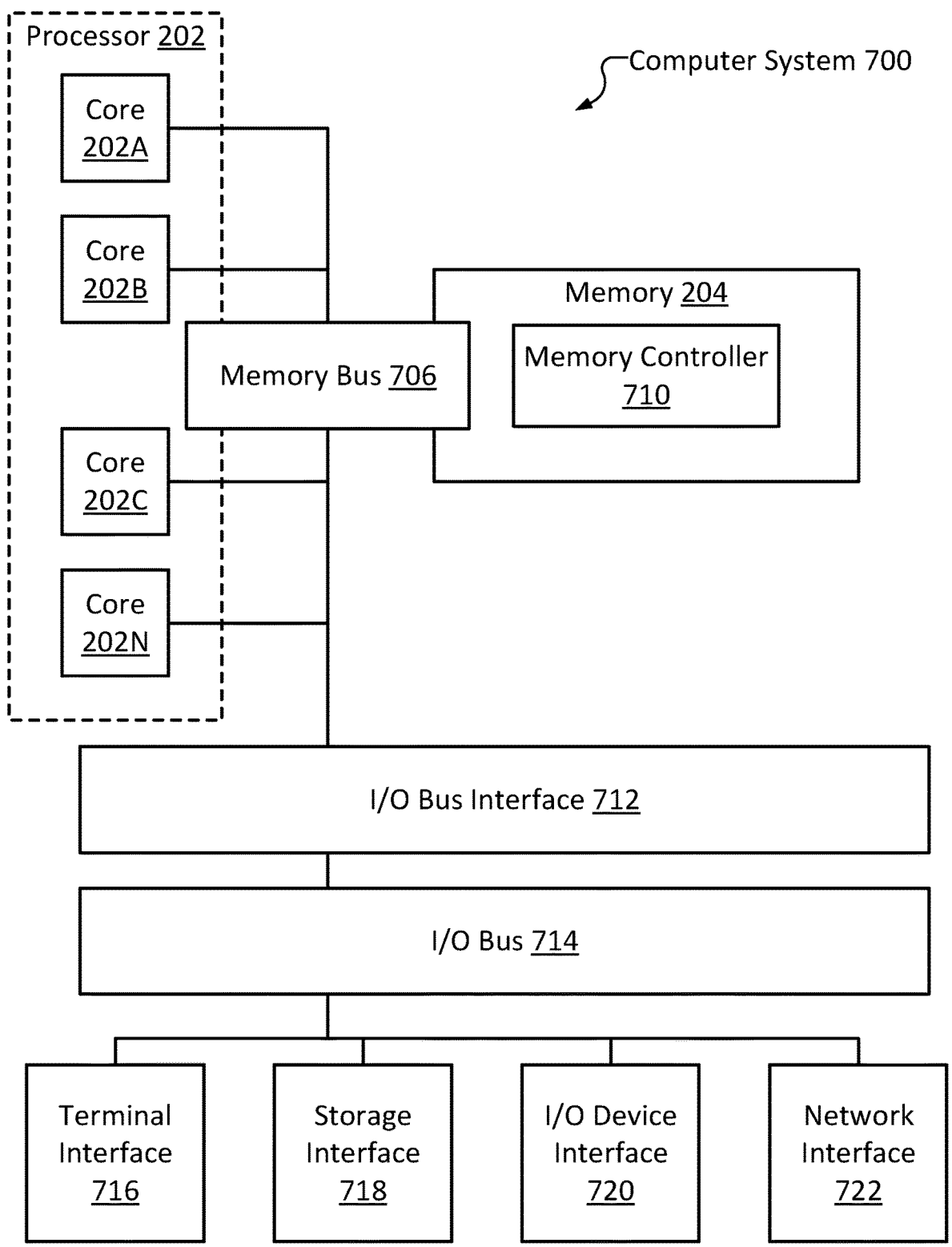
FIG. 7 illustrates a high-level block diagram of an example computer system that may be used in implementing embodiments of the present disclosure.

Referring now to FIG. 7, shown is a high-level block diagram of an example computer system 700 that may be configured to perform various aspects of the present disclosure, including, for example, methods 100, 300, and/or 400. The example computer system 700 may be used in implementing one or more of the methods or modules, and any related functions or operations, described herein (e.g., using one or more processor circuits or computer processors of the computer), in accordance with embodiments of the present disclosure. In some embodiments, the major components of the computer system 700 may comprise a CPU 202 with one or more CPU cores 202, a memory subsystem 204, a terminal interface 716, a storage interface 718, an I/O (Input/Output) device interface 720, and a network interface 722, all of which may be communicatively coupled, directly or indirectly, for inter-component communication via a memory bus 732, an I/O bus 714, and an I/O bus interface unit 712.

The computer system 700 may contain one or more general-purpose programmable central processing units (CPUs) 202, some or all of which may include one or more cores 202A, 202B, 202C and 202N, herein generically referred to as the CPU 202. In some embodiments, the computer system 700 may contain multiple processors typical of a relatively large system; however, in other embodiments the computer system 700 may alternatively be a single CPU system. Each CPU 202 may execute instructions stored in the memory subsystem 204 on a CPU core 202 and may comprise one or more levels of on-board cache.

In some embodiments, the memory subsystem 204 may comprise a random-access semiconductor memory, storage device, or storage medium (either volatile or non-volatile) for storing data and programs. In some embodiments, the memory subsystem 204 may represent the entire virtual memory of the computer system 700 and may also include the virtual memory of other computer systems coupled to the computer system 700 or connected via a network. The memory subsystem 204 may be conceptually a single monolithic entity, but, in some embodiments, the memory subsystem 204 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 204 may contain elements for control and flow of memory used by the CPU 202. This may include a memory controller 710.

Although the memory bus 732 is shown in FIG. 7 as a single bus structure providing a direct communication path among the CPU 202, the memory subsystem 204, and the I/O bus interface 712, the memory bus 732 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 712 and the I/O bus 714 are shown as single respective units, the computer system 700 may, in some embodiments, contain multiple I/O bus interface units 712, multiple I/O buses 714, or both. Further, while multiple I/O interface units are shown, which separate the I/O bus 714 from various communications paths running to the various I/O devices, in other embodiments some or all of the I/O devices may be connected directly to one or more system I/O buses.

In some embodiments, the computer system 700 may be a multi-user mainframe computer system, a single-user system, or a server computer or similar device that has little or no direct user interface but receives requests from other computer systems (clients). Further, in some embodiments, the computer system 700 may be implemented as a desktop computer, portable computer, laptop or notebook computer, tablet computer, pocket computer, telephone, smart phone, mobile device, or any other appropriate type of electronic device.

It is noted that FIG. 7 is intended to depict the representative major components of an exemplary computer system 700. In some embodiments, however, individual components may have greater or lesser complexity than as represented in FIG. 7, components other than or in addition to those shown in FIG. 7 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method, comprising:
    obtaining a request;
    determining that a server is unable to process the request; and
    responsive to the determination that the server is unable to process the request:
        selecting one or more buffer tasks;
        presenting the one or more buffer tasks to a user;
        pinging the server; and
        determining, based on the pinging, whether the server is still unable to process the request.

2. The method of claim 1, further comprising, responsive to the determination that the server is unable to process the request, identifying a priority level of the request, wherein the selecting one or more buffer tasks is based, at least in part, on the priority level of the request.

3. The method of claim 2, wherein the priority level of the request is based on a purchase history.

4. The method of claim 1, further comprising:
determining that the server is no longer unable to process the request; and
responsive to the determination that the server is no longer unable to process the request, sending the request to the server.

5. The method of claim 1, further comprising generating, responsive to the determination that the server is unable to process the request, an estimated delay time, wherein the selecting the buffer tasks is based further on the estimated delay time.

6. The method of claim 1, wherein the selecting the buffer tasks is based further on a success rating of at least one of the one or more buffer tasks.

7. The method of claim 1, wherein the selecting comprises selecting the one or more buffer tasks from a buffer task database.

8. A system, comprising:
a memory;
a central processing unit (CPU) configured to:
obtain a request;
determine that a server is unable to process the request; and
responsive to the determination that the server is unable to process the request:
select one or more buffer tasks;
present the one or more buffer tasks to a user;
ping the server; and
determine, based on the pinging, whether the server is still unable to process the request.

9. The system of claim 8, wherein the CPU is further configured to, responsive to the determination that the server is unable to process the request, identify a priority level of the request, wherein the one or more buffer tasks is selected based, at least in part, on the priority level of the request.

10. The system of claim 9, wherein the priority level of the request is based on a purchase history stored in a knowledge base in the memory.

11. The system of claim 8, wherein the CPU is further configured to:
determine that the server is no longer unable to process the request; and
responsive to the determination that the server is no longer unable to process the request, send the request to the server.

12. The system of claim 8, wherein the CPU is further configured to select the one or more buffer tasks from a buffer task database in the memory.

13. The system of claim 8, wherein:
the CPU is further configured to generate, responsive to a determination that the server is overloaded, an estimated delay time; and
the selecting the one or more buffer tasks is based further on the estimated delay time.

14. The system of claim 8, wherein the selecting the one or more buffer tasks is based further on a success rating of at least one of the one or more buffer tasks.

15. A computer program product, the computer program product comprising a computer readable storage medium having program instructions embodied therewith, the program instructions executable by a computer to cause the computer to:
obtain a request;
determine that a server is unable to process the request; and
responsive to the determination that the server is unable to process the request:
select one or more buffer tasks;
present the one or more buffer tasks to a user;
ping the server; and
determine, based on the pinging, whether the server is still unable to process the request.

16. The computer program product of claim 15, wherein the instructions further cause the computer to, responsive to the determination that the server is unable to process the request, identify a priority level of the request, wherein the one or more buffer tasks is selected based, at least in part, on the priority level of the request.

17. The computer program product of claim 16, wherein the priority level of the request is based on a purchase history.

18. The computer program product of claim 15, wherein the instructions further cause the computer to:
determine that the server is no longer unable to process the request; and
responsive to the determination that the server is no longer unable to process the request, send the request to the server.

19. The computer program product of claim 15, wherein the instructions further cause the computer to select the one or more buffer tasks from a buffer task database.

20. The computer program product of claim 15, wherein the instructions further cause the computer to select the one or more buffer tasks based further on a success rating of at least one of the one or more buffer tasks.

* * * * *